United States Patent
Wheater

(10) Patent No.: US 9,164,516 B2
(45) Date of Patent: Oct. 20, 2015

(54) METHOD AND APPARATUS FOR CONTROLLING A FLUID OPERATED ACTUATOR

(75) Inventor: Christopher John Wheater, York (GB)

(73) Assignee: Norgren Limited, Staffordshire (GB)

( * ) Notice: Subject to any disclaimer, the term of this patent is extended or adjusted under 35 U.S.C. 154(b) by 843 days.

(21) Appl. No.: 13/131,716

(22) PCT Filed: Dec. 11, 2008

(86) PCT No.: PCT/EP2008/067361
§ 371 (c)(1),
(2), (4) Date: May 27, 2011

(87) PCT Pub. No.: WO2010/066302
PCT Pub. Date: Jun. 17, 2010

(65) Prior Publication Data
US 2011/0239853 A1    Oct. 6, 2011

(51) Int. Cl.
*F15B 9/12*     (2006.01)
*G05D 3/12*     (2006.01)
*G05D 3/20*     (2006.01)

(52) U.S. Cl.
CPC   *G05D 3/125* (2013.01); *F15B 9/12* (2013.01); *G05D 3/20* (2013.01)

(58) Field of Classification Search
CPC ......................................................... F15B 9/12
USPC ............................................................ 91/372
See application file for complete search history.

(56) References Cited

U.S. PATENT DOCUMENTS

| 2,400,126 | A | * | 5/1946 | Matthews | 91/434 |
| 3,171,329 | A | * | 3/1965 | Rasmussen | 91/372 |
| 3,859,791 | A | * | 1/1975 | Allen et al. | 91/433 |
| 3,905,720 | A | * | 9/1975 | Greune et al. | 91/368 |
| 5,190,068 | A | | 3/1993 | Philbin | |
| 7,104,053 | B2 | | 9/2006 | Gast | |
| 2003/0208305 | A1 | | 11/2003 | Junk et al. | |
| 2004/0011411 | A1 | | 1/2004 | Thordarson | |
| 2004/0154466 | A1 | | 8/2004 | Gethmann et al. | |

FOREIGN PATENT DOCUMENTS

| CN | 1650109 A | 8/2005 |
| CN | 1774592 A | 5/2006 |
| CN | 1802615 A | 7/2006 |
| GB | 2140871 A | 12/1984 |

* cited by examiner

*Primary Examiner* — F. Daniel Lopez
(74) *Attorney, Agent, or Firm* — The Ollila Law Group LLc

(57) ABSTRACT

A positioner (102) for controlling a fluid operated actuator (101) including a first fluid chamber (109) and a second fluid chamber (110) is provided. The positioner (102) comprises a first fluid conduit (105) coupled to the first fluid chamber (109). The positioner (102) also comprises a second fluid conduit (106) coupled to the second fluid chamber (110). A differential pressure controller (240) provided in the positioner (102) is adapted to control a fluid supply to the first and second fluid conduits (105, 106) based on a differential pressure between the first and second fluid chamber (109, 110).

3 Claims, 3 Drawing Sheets

METHOD AND APPARATUS FOR CONTROLLING A FLUID OPERATED ACTUATOR

TECHNICAL FIELD

The present invention relates to fluid operated actuators, and more particularly, to a method and apparatus for controlling a position of a fluid operated actuator based on a differential pressure of the fluid operated actuator.

BACKGROUND OF THE INVENTION

Fluid operated actuators convert a fluid pressure to a work piece using an actuator that typically consists of a piston in a cylinder. Although there are various suitable fluids that may be used, the fluid applied to the actuator generally comprises pneumatic or hydraulic fluid, for example. Pneumatic operated actuators are generally used where the compressibility of air is desired or to obtain much higher flow rates and thus faster response times while hydraulic operated actuators are generally employed when high actuating forces are required. Both fluids have advantages and in some situations, either pneumatic or hydraulic fluid may be used.

The position of the fluid operated actuator is usually controlled with a group of devices referred to in the art as 'positioners.' The positioners are designed to control the position of the fluid operated actuator in response to a user/operator input or a change in the environmental conditions, such as a change in the load acting on the actuator. Existing products commonly found on the market include positioners of a wide spectrum of levels of sophistication and complexity, ranging from positioners that use simple mechanical feedback mechanisms to control the position of the actuator, to more complex positioners that incorporate a combination of mechanical, electronic, and software technologies to provide a higher capability of control.

The particular positioner employed generally depends on two performance criteria, namely, speed and stability. A significant problem with existing designs is that a compromise must be made between these two performance criteria. As the speed of the actuation is increased, the stability of the control system is decreased until the control system becomes totally unstable. The speed of actuation is largely dictated by the quantity of fluid flow that can be provided by the positioner. One established solution to this problem is to add external boosters to a positioner and actuator positioning system. These boosters provide much higher fluid flow levels to the actuator, thus speeding up the response of the system. However, the increase in speed often increases cost and complexity of the additional boosters along with requiring additional pipe work.

Another problem with existing products relates to the sensitivity of the control system to changes and non-linearities within components contained within the control valve that is internal to the positioner. These changes may be caused by environmental changes such as temperature and orientation, or changes over time such as drift and wear. The non-linearity of components may be caused by friction amongst other factors. To combat these changes and non-linearity problems, additional complexity and cost is usually necessary within the algorithms of the positioner.

The present invention enables positioners to be made that have speeds of actuation that approach or exceed systems fitted with external boosters, while maintaining stability without the additional cost and complexity of the boosters.

The present invention overcomes the problems associated with changes and non-linearity within components contained within the control valve that is internal to the positioner.

Aspects

According to an aspect of the invention, a positioner for controlling a fluid operated actuator including a first fluid chamber and a second fluid chamber (110) comprises:
- a first fluid conduit coupled to the first fluid chamber;
- a second fluid conduit coupled to the second fluid chamber; and
- a differential pressure controller adapted to control a fluid supply to the first and second fluid conduits based on a differential pressure between the first and second fluid chamber.

Preferably, the positioner further comprises a differential pressure sensor adapted to measure a differential pressure between the first and second fluid chambers.

Preferably, the positioner further comprises a fluid control valve including:
- a fluid inlet coupled to a pressurized fluid source;
- a first fluid outlet coupled to the first fluid conduit; and
- a second fluid outlet coupled to the second fluid conduit.

Preferably, the positioner further comprises a position sensor coupled to the actuator.

Preferably, the differential pressure controller is further adapted to generate a desired differential pressure based on a desired actuator position and a measured actuator position.

Preferably, the differential pressure controller is further adapted to compare the desired differential pressure to a measured differential pressure.

Preferably, the positioner further comprises a diaphragm assembly coupled to the actuator including:
- a pilot chamber;
- a first biasing chamber; and
- a second biasing chamber.

Preferably, the pilot chamber comprises a pilot inlet and a pilot diaphragm.

Preferably, the first biasing chamber comprises a first biasing diaphragm and a first fluid port coupled to the first fluid conduit and wherein pressure within the first fluid conduit acts on the first biasing diaphragm to bias the diaphragm assembly in a first direction.

Preferably, a fluid control valve is actuated to a first position when the fluid pressure within the first biasing chamber reaches a threshold value.

Preferably, the second biasing chamber comprises a second biasing diaphragm and a second fluid port coupled to the second fluid conduit and wherein pressure within the second fluid conduit acts on the second biasing diaphragm to bias the diaphragm assembly in a second direction.

Preferably, a fluid control valve is actuated to a second position when the fluid pressure within the second biasing chamber reaches a threshold value.

Preferably, the diaphragm assembly is coupled to a fluid control valve.

According to another aspect of the invention, a positioner for controlling a fluid operated actuator, including a first fluid chamber and a second fluid chamber, the positioner comprises:
- a fluid control valve;
- a first fluid conduit coupled to a first outlet of the fluid control valve and the first fluid chamber;
- a second fluid conduit coupled to a second outlet of the fluid control valve and the second fluid chamber; and
- a diaphragm assembly coupled to the fluid operated actuator, the first fluid conduit, the second fluid conduit, and the fluid control valve, wherein the diaphragm assembly is adapted to control the fluid control valve based on a differential pressure between the first fluid conduit and the second fluid conduit.

Preferably, the diaphragm assembly comprises:
a pilot chamber;
a pilot diaphragm; and
a pilot inlet adapted to receive a pilot pressure to pressurize the pilot chamber and bias the pilot diaphragm.

Preferably, the diaphragm assembly comprises:
a first biasing diaphragm; and
a first biasing chamber including a first fluid port coupled to the first fluid conduit and wherein pressure within the first fluid conduit acts on the first biasing diaphragm to bias the diaphragm assembly in a first direction.

Preferably, the control valve is actuated to a first position when the pressure in the first biasing chamber reaches a threshold value.

Preferably, the diaphragm assembly comprises:
a second biasing diaphragm; and
a second biasing chamber including a second fluid port coupled to the second fluid conduit and wherein pressure within the second fluid conduit acts on the second biasing diaphragm to bias the diaphragm assembly in a second direction.

Preferably, the control valve is actuated to a second position when the pressure in the second biasing chamber reaches a threshold value.

Preferably, the positioner further comprises a position sensor coupled to the actuator.

Preferably, the positioner further comprises a differential pressure sensor adapted to measure a differential pressure between the first and second fluid chambers.

According to another aspect of the invention, a method for controlling a fluid operated actuator including a first fluid chamber and a second fluid chamber comprises the steps of:
generating a desired differential pressure between the first and second fluid chambers; and
controlling a fluid supply to at least one of the first or second fluid chambers to control a position of the fluid operated actuator based on the desired differential pressure.

Preferably, the method further comprises the steps of:
measuring a differential pressure between the first and second fluid chambers; and
actuating a fluid control valve if the difference between the measured differential pressure and the desired differential pressure exceeds a threshold value.

Preferably, the step of supplying fluid pressure to at least one of the first or second fluid chambers comprises adjusting a pilot pressure supplied to a diaphragm assembly coupled to the actuator to control the differential pressure between the first and second fluid chambers.

Preferably, the differential pressure between the first and second fluid chambers controls a position of a fluid control valve.

Preferably, the method further comprises the steps of:
measuring a position of the actuator;
comparing measured actuator position to a desired actuator position, and
generating a new desired differential pressure if the difference between the measured actuator position and the desired actuator position exceeds a threshold value.

DETAILED DESCRIPTION OF THE INVENTION

Figure 1:
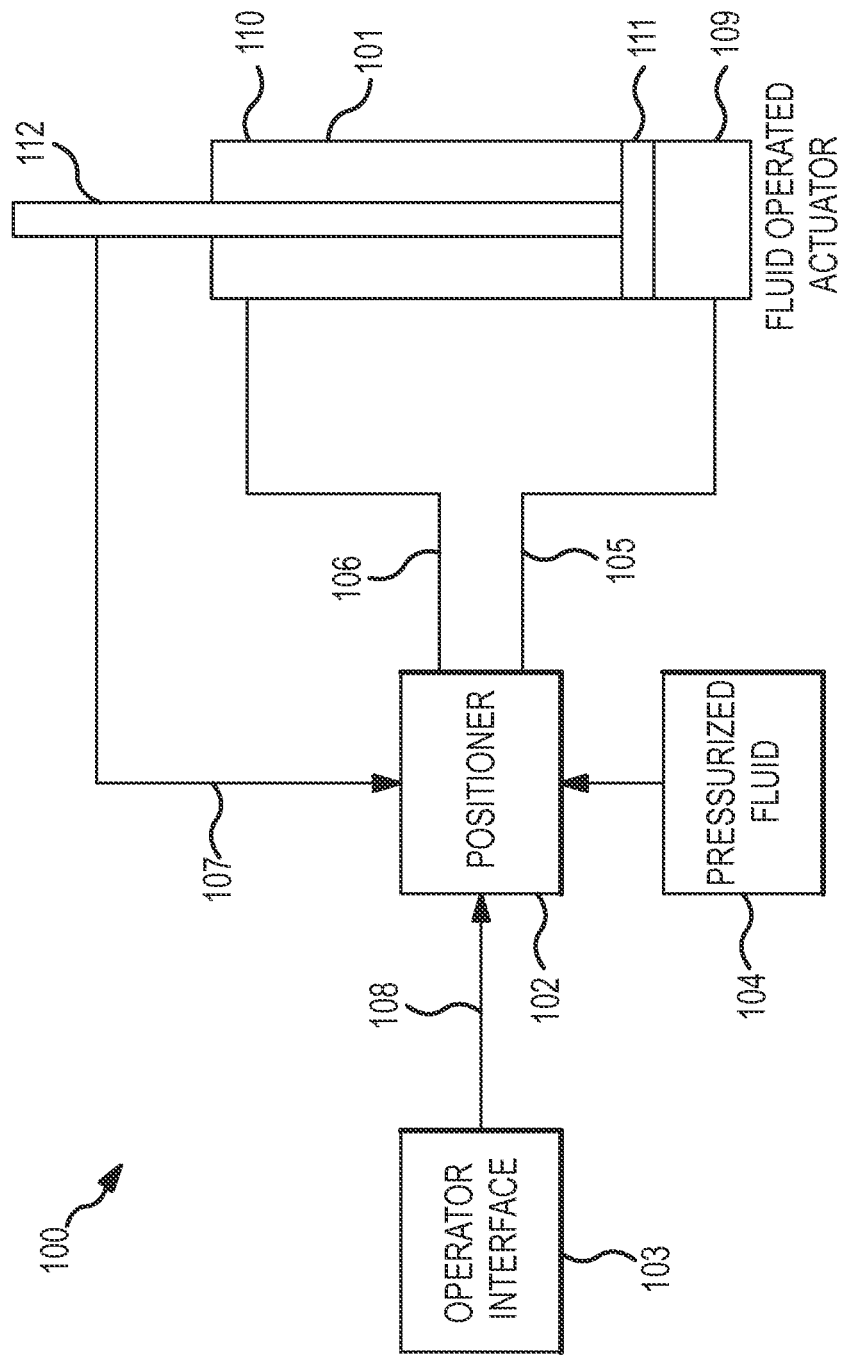
FIG. 1 shows a block diagram of a fluid operated actuator system according to an embodiment of the invention.
Figure 2:
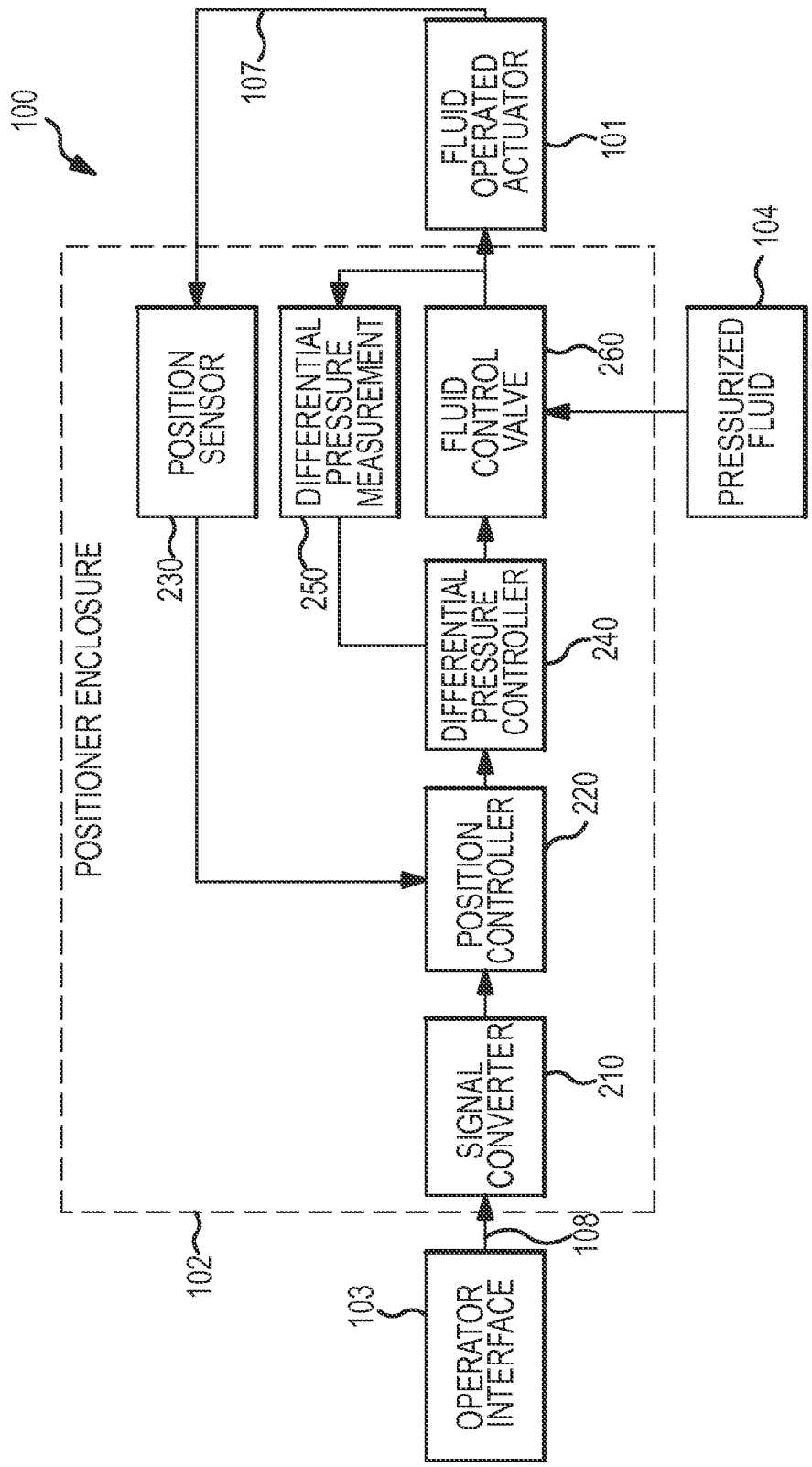
FIG. 2 shows a positioner according to an embodiment of the invention.
Figure 3:
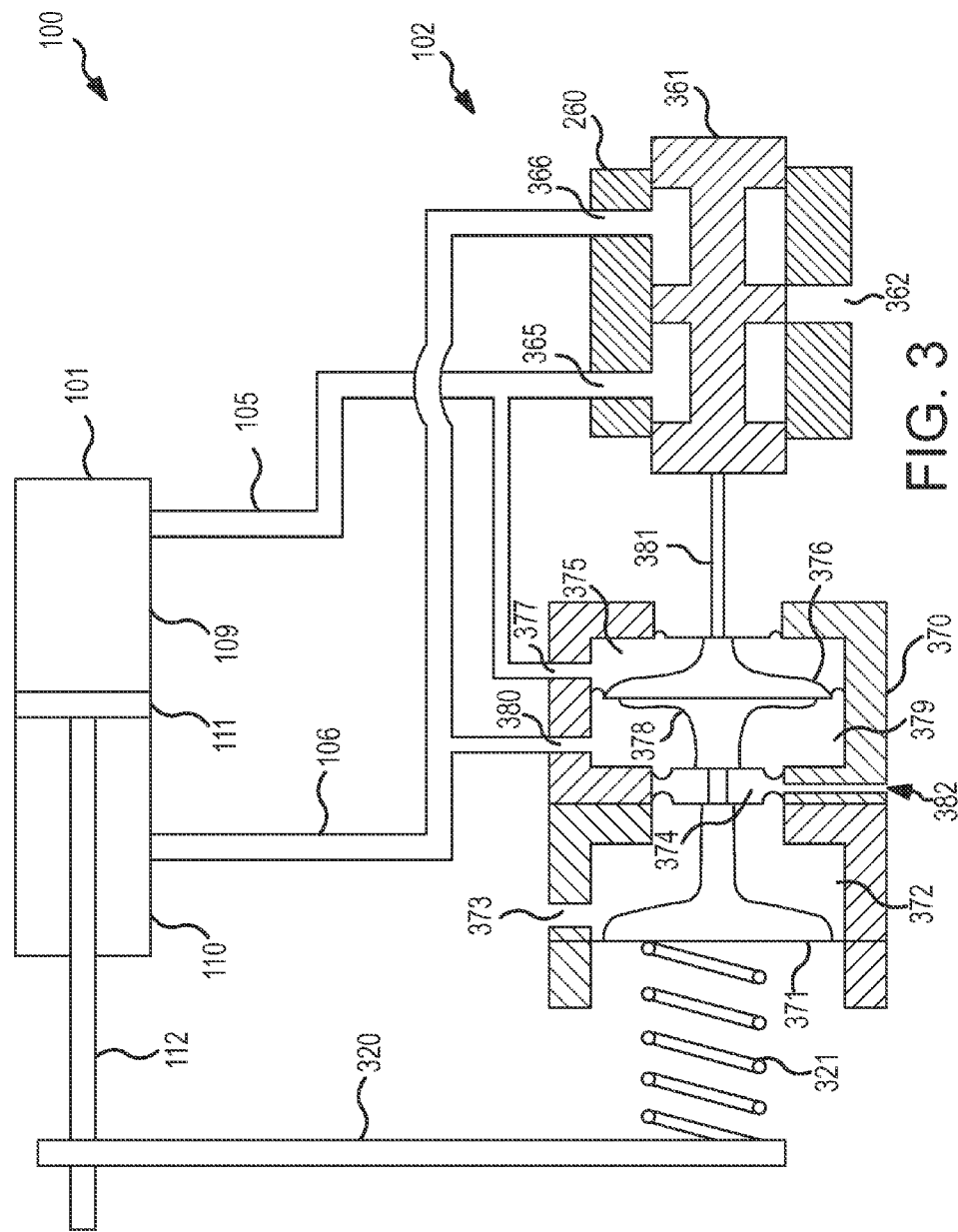
FIG. 3 shows the fluid operated actuator system according to another embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a block diagram of a fluid operated actuator system 100 according to an embodiment of the invention. The actuator system 100 comprises a fluid operated actuator 101, a positioner 102, an operator position interface 103, and a source of pressurized fluid 104. According to an embodiment of the invention, a user/operator can input a desired actuator position at the operator interface 103, which can communicate with the positioner 102 via lead 108. The lead 108 may comprise wire leads, or alternatively may comprise wireless technology suitable for transmitting such signals.

According to an embodiment of the invention, the actuator 101 can comprise a piston cylinder arrangement including a piston 111 and a piston rod 112. The piston rod 112 can act on a work piece (not shown) to move the work piece in a desired direction. It should be understood that the actuator 101 may comprise other well known configurations and a piston cylinder is shown merely as an example and in no way should it limit the scope of the present invention. According to an embodiment of the invention, the piston 111 can separate the actuator 101 into a first fluid chamber 109 and at least a second fluid chamber 110. It should be appreciated that if the pressure in the first fluid chamber 109 is greater than the pressure in the second fluid chamber 110, the piston 111 will be biased in a first direction (up as shown in FIG. 1). Similarly, if the pressure in the second fluid chamber 110 is greater than the pressure in the first fluid chamber 109, the piston 111 will be biased in a second direction (down as shown in FIG. 1).

As shown in FIG. 1, the positioner 102 can be coupled to the actuator 101 via a first fluid conduit 105. The first fluid conduit 105 can communicate pressurized fluid between the positioner 102 and the first fluid chamber 109 of the actuator 101. In addition, the positioner 102 can also be coupled to the actuator 101 via a second fluid conduit 106. The second fluid conduit 106 can communicate pressurized fluid between the positioner 102 and the second fluid chamber 110 of the actuator 101. The first and second fluid conduits 105, 106 may also be in communication with an exhaust (not shown) in order to depressurize the first and second fluid chambers 109, 110 of the actuator 101.

According to an embodiment of the invention, the first and second conduits 105, 106 may include pressure sensors (not shown), which can measure a fluid pressure within the conduits 105, 106. According to an embodiment of the invention, the pressure within the fluid conduits 105, 106 is substantially the same as the pressure within the first and second fluid chambers 109, 110 of the actuator 101, respectively. Therefore, the pressure sensors in the fluid conduits 105, 106 can also measure the pressure within the first 109 and second 110 fluid chambers of the actuator 109. The measured pressure in each chamber 109, 110 can be used to generate a measured differential pressure. The positioner 102 can provide fluid to the actuator 101 based on the differential pressure, as discussed in more detail below. According to an embodiment of the invention, the positioner 102 may also receive information regarding the position of the actuator 101 via a position sensor (not shown) coupled to the positioner 102 via lead 107. The lead 107 may optionally be replaced with a wireless communication interface.

FIG. 2 shows the positioner 102 in greater detail according to an embodiment of the invention. According to the embodiment shown in FIG. 2, the positioner 102 can receive a signal from the operator interface 103 via lead 108. As with all of the connections shown in the present invention, it should also be appreciated that the lead 108 could comprise a wireless communication system. In some embodiments, the signal received from the operator interface 103 may need to be converted into a format useable by a position controller 220. Therefore, according to an embodiment of the invention, the positioner 102 may include a signal converter 210. According to an embodiment of the invention, the signal received from the operator interface 103 may comprise a 4-20 mA signal. The 4-20 mA signal may provide power to the positioner 102 along with a desired actuator position as is generally understood in the art. The signal converter 210 can convert the 4-20 mA signal into a useable format. It should be understood that the signal received by the operator interface 103 does not have to comprise a 4-20 mA signal, but rather may comprise any desired format. Therefore, the present invention should not be limited to a 4-20 mA circuit.

According to an embodiment of the invention, once the signal converter 210 converts the signal received from the operator interface 103, the signal can be sent to the position controller 220. The position controller 220 may receive the signal from the signal converter 210 along with another signal from a position sensor 230. The two signals may be compared to one another. Based on the comparison, a desired differential pressure may be generated. The desired differential pressure comprises the differential pressure between the first fluid chamber 109 of the actuator 101 and the second fluid chamber 110 of the actuator 101 required to move the piston 111 to the desired position, or alternatively, hold the piston 111 in the desired position. The desired differential pressure can be sent to a differential pressure controller 240.

According to an embodiment of the invention, the differential pressure controller 240 can receive a first input from the position controller 220 and a second input from a differential pressure sensor 250. The differential pressure sensor 250 can measure a differential pressure between the first fluid chamber 109 and the second fluid chamber 110 of the actuator 101. In some embodiments, the differential pressure sensor 250 can be located in the first and second fluid conduits 105, 106 coupling the fluid control valve 260 to the actuator 101. The differential pressure controller 240 can compare the desired differential pressure received from the position controller 220 to the measured differential pressure received from the differential pressure sensor 250. According to an embodiment of the invention, if the difference between the desired differential pressure and the measured differential pressure is less than a threshold value, the differential pressure controller 240 may provide a signal to the fluid control valve 260 representing no desired change in the valve position. In contrast, if the difference between the desired differential pressure and the measured differential pressure exceeds a threshold value, the differential pressure controller 240 may signal the fluid control valve 260 to change positions to provide more or less pressurized fluid to either the first fluid chamber 109 or the second fluid chamber 110 of the actuator 101. According to an embodiment of the invention, the signal sent by the differential pressure controller 240 may also comprise a signal to exhaust one or both of the first fluid chamber 109 and the second fluid chamber 110.

According to an embodiment of the invention, the fluid control valve 260 can communicate with the first fluid chamber 109 of the actuator 101 via the first fluid conduit 105 and with the second fluid chamber 110 of the actuator 101 via the second fluid conduit 106. According to an embodiment of the invention, the fluid control valve 260 can comprise a 5/3 valve (five ports and three operating positions). According to another embodiment of the invention, the fluid control valve 260 may comprise a spool valve, for example, such as the spool valve shown in FIG. 3 and discussed in more detail below. However, it should be understood that other valves may be implemented as desired.

According to an embodiment of the invention, a differential pressure control loop can be formed using the differential pressure sensor 250, the fluid control valve 260, and the differential pressure controller 240. The differential pressure control loop enables the force acting upon the actuator 101 and the resultant force acting upon the actuator load to be controlled with greater refinement than could be realized in the prior art. This is because the force of the actuator 101 is directly proportional to the pressure, thus providing enhanced position control. Positioners according to the prior art control the flow of fluid using only a position sensor, such as the position sensor 230. In contrast, the present invention controls the differential pressure rather than the flow rate flowing through the fluid control valve 260. In addition, the differential pressure control loop compensates for changes and non-linear characteristics within the fluid control valve 260.

According to an embodiment of the invention, the positioner 102 may include an outer control loop comprising the position sensor 230, the position controller 220, the differential pressure controller 240, and the fluid control valve 260. According to an embodiment of the invention, the outer control loop can be provided as a backup control system in addition to the differential pressure control loop discussed above. The outer control loop may monitor the position of the actuator using the position sensor 230, for example. The position sensor 230 can send the actuator position to the position controller 220. The position controller 220 can compare the desired actuator position to the actuator position determined by the position sensor 230. If the position sensed by the position sensor 230 is different from the desired actuator position by more than a threshold value, the position controller 220 can send a signal to the differential pressure controller 240 to adjust the desired differential pressure. According to an embodiment of the invention, the threshold value used by the position sensor 230 in the outer control loop is greater than the threshold value used by the differential pressure controller 240 used in the differential pressure control loop. By creating a threshold value higher in the outer control loop, the differential pressure control loop comprises the primary control loop.

In some circumstances, it may be desirable to control the differential pressure mechanically rather than using electronic controllers to adjust the fluid control valve 260. Therefore, the present invention provides a closed loop feedback that utilizes the actuator position as well as the differential pressure experienced by the actuator 101 in order to control the fluid control valve.

FIG. 3 shows the fluid operated actuator system 100 including the positioner 102 according to another embodiment of the invention. The positioner 102 shown in FIG. 3 includes the actuator 101, a fluid control valve 260, and a diaphragm assembly 370. The piston rod 112 is coupled to the diaphragm assembly 370. In the embodiment shown, a coupling member 320 and a spring 321 are used to couple the piston rod 112 to the diaphragm assembly 370. It should be understood that although a spring 321 is shown, the invention could include other biasing devices as is generally known in the art. Therefore, the present invention should not be limited to springs.

The diaphragm assembly 370 comprises a pilot diaphragm 371, a pilot chamber 372, and a pilot inlet 373. The pilot diaphragm 371 is coupled to a separating diaphragm 374. The separating diaphragm 374 separates the pilot chamber 372 from biasing chambers 375, 379. According to an embodiment of the invention, the separating diaphragm 374 is open to the environment through a port 382. This prevents the separating diaphragm 374 from developing a vacuum and hindering movement of the diaphragm. According to an embodiment of the invention, the diaphragm assembly 370 also includes a first and a second biasing chamber 375, 379. The first biasing chamber 375 comprises a first biasing diaphragm 376 and a first fluid port 377. The first fluid port 377 is coupled to and communicates with the first fluid conduit 105. Therefore, pressure within the first fluid conduit 105 can also be delivered to the first biasing chamber 375 to pressurize and bias the first biasing diaphragm 376.

The first biasing diaphragm 376 can be coupled to a second biasing diaphragm 378. It should be appreciated that the first and second biasing diaphragms 376, 378 may not comprise the same size and/or the same material. Therefore, different pressures may be required to deform the first and second biasing diaphragms 376, 378. This can be advantageous as described in more detail below. Pressure within a second biasing chamber 379 can act on the second biasing diaphragm 378 to bias the diaphragm to the right (as shown in FIG. 3). Pressure can be delivered to the second biasing chamber 379 via a second fluid port 380, which is coupled to and communicates with the second fluid conduit 106. Therefore, pressure within the second fluid conduit 106 can be delivered to the second biasing chamber 379 substantially immediately.

According to an embodiment of the invention, the first and second biasing diaphragms 376, 378 are coupled to the spool valve 260. In some embodiments, the first and second biasing diaphragms 376, 378 are coupled to the spool 361. Therefore, as the first and second biasing diaphragms 376, 378 move in response to pressure within the first and second biasing chambers 375, 379, the spool 361 can also move. According to an embodiment of the invention, the spool valve 260 includes the spool 361, an inlet 362, a first outlet 365, and a second outlet 366. Although FIG. 3 shows pilot and biasing diaphragms, it should be appreciated that the diaphragms may be replaced with other suitable members, such as bellows, for example. Therefore, the present invention should not be limited to diaphragms.

In operation, the spool valve 260 controls the flow of the input pressure supplied by the pressurized fluid source 104. The spool 361 can direct fluid from the inlet 362 to either the first or the second outlet 365, 366. The spool 361 can be controlled according to a differential pressure in the fluid conduits 105, 106, or alternatively, based on a position of the actuator 101 determined by the position sensor 230, for example.

The positioner 102 can advantageously compensate for changes in the load acting on the piston rod 112. If for example, the piston 111 moves in a retracting direction (to the right as shown in FIG. 3), because of an increase in the force applied by the work piece (not shown) coupled to the piston rod 112, the coupling member 320 will also move to the right. As the coupling member 320 moves to the right, the pilot diaphragm 371 moves to the right as well under the force of the compressed spring member 321. The amount of movement of the pilot diaphragm 371 may depend on the spring strength as well as the resiliency of the diaphragm 371. Because the pilot diaphragm 371 is coupled to the first and second biasing diaphragms 376, 378, the diaphragms will be biased to the right as well. As the biasing diaphragms 376, 378 move to the right, the spool 361 will also move to the right via the coupling rod 381. This movement of the spool 361 opens a fluid flow path from the inlet 362 to the outlet 365 delivering pressurized fluid to the first fluid chamber 109. The increased pressure within the first fluid chamber 109 can counter the increased force of the work piece.

According to an embodiment of the invention, fluid may be supplied to the first fluid chamber 109 of the actuator 101 until the differential pressure within the actuator 101 is once again back to the desired level. This may be accomplished when the piston 111 returns to the position it was at prior to the increased load. As the piston 111 returns to its position prior to the increased load, the increased pressure within the first fluid chamber 109 is also experienced within the first biasing chamber 375. Once the pressure reaches a threshold value, the increased pressure within the first biasing chamber 375 can provide a biasing force on the first biasing diaphragm 376 towards the second direction (to the left as shown in FIG. 3). With a great enough pressure within the first biasing chamber 375, the spool 361 will be biased in the second direction (to the left as shown in FIG. 3) thereby closing the fluid flow path from the inlet 362 to the first outlet 365.

It should be appreciated that as the pressure within the first biasing chamber 375 increases to bias the first and second biasing diaphragms 376, 378 to the left, the pressure within the second biasing chamber 379 will also increase. This increased pressure is due to the decreased area within the second fluid chamber 110 of the actuator 101. The increased pressure within the second fluid chamber 110 as well as the second biasing chamber 379 can counter the increased pressure within the first biasing chamber 375.

It should be appreciated that the diaphragm assembly 370 will operate in a similar manner in the event of a decreased load applied to the actuator, however, the diaphragms will move in the opposite direction to that described above.

The threshold value required to deform the first and second biasing diaphragms 376, 378 can be adjusted or changed in a number of ways. According to one embodiment, the threshold value may be adjusted using different sized diaphragms or diaphragms from different materials, for example. According to another embodiment, the threshold value may be adjusted by adjusting the pilot chamber. This may comprise adjusting the pilot pressure, or alternatively, adjusting the spring member 321. It should be appreciated that these are merely examples and those skilled in the art will readily recognize additional methods for adjusting the threshold value.

It should be appreciated that in some embodiments, the pressure acting on each side of the piston 111 may not create an equal amount of force due to different cross-sectional areas. For example, if the actuator 101 comprises a piston cylinder arrangement with a piston rod 112 as shown, the exposed cross-sectional area of the piston 111 is greater on the first fluid chamber 109 than on the second fluid chamber 110. This is because a portion of the piston's cross sectional area is covered by the piston 112. Therefore, a greater amount of pressure is required in the second fluid chamber 110 than in the first fluid chamber 109 to create a substantially equal amount of force. This force difference can be compensated for using different diaphragm members for the first and second biasing diaphragms 376, 378. For example, the first biasing diaphragm 376 may require a greater force to bias than the second biasing diaphragm 378.

In addition, to compensating for changes in the load applied to the piston rod 112, the positioner 102 can also control the position of the actuator 101 and adjust the position as needed or desired even though the load on the piston rod 112 remains substantially the same. According to an embodiment of the invention, the piston 111 may be repositioned by adjusting the pilot pressure provided to the pilot inlet 373. Take for example, the situation where it is desired to extend the piston 111, i.e., move the piston to the left as shown in FIG. 3. A signal can be sent to a pilot controller (not shown) to decrease the pilot pressure, thereby decreasing the pressure in the pilot chamber 372. The decreased pressure in the pilot chamber 372 can act on the pilot diaphragm 371, biasing the diaphragm 371 to the right. In response, the first and second biasing diaphragms 376, 378 also move to the right via the separating diaphragm 374. Because the coupling rod 381 is coupled to both the first and second biasing diaphragms 376, 378 as well as the spool 361, the spool 361 also moves to the right. As the spool 361 moves to the right, supply pressure is delivered from the inlet 362 to the first outlet 365, the first fluid conduit 105, and the first fluid chamber 109 of the actuator 101. Once the pressure in the first fluid chamber 109 of the actuator 101 increases by a threshold amount, the piston 111 will extend (move to the left).

Although the increased pressure in the first fluid conduit 105 also increases the pressure within the first biasing chamber 375, the increased pressure is offset by the increased pressure in the second fluid chamber 110 of the actuator 101 and thus, the second biasing chamber 379. The increased pressure within the second biasing chamber 379 is caused by the decreased volume of the second biasing chamber 379 as the separating diaphragm 374 pushes the first and second biasing diaphragms 376, 378 to the right. In addition, the pressure within second fluid chamber 110 as well as the second biasing chamber 379 increases by the decreased volume of the second fluid chamber 110 as the piston 111 moves to the left. Therefore, the differential pressure within the actuator 101 is also experienced within the diaphragm assembly 370. Once the desired differential pressure is reached, the pilot pressure can be adjusted such that the diaphragm assembly 370 equilibrates causing the fluid control valve 260 to close. It should be appreciated that movement of the piston 111 in the opposite direction can be accomplished in a similar manner by increasing the pilot pressure rather than decreasing it.

It should be appreciated from the above discussion that the positioner 102 shown in FIG. 3, can eliminate the requirement of a differential pressure sensor or electronic means for controlling the position of the fluid control valve. Rather, the diaphragm assembly 370 may be calibrated such that a predetermined pilot pressure supplied to the pilot chamber 372 can create a predetermined differential pressure. In addition, if the differential pressure between the first fluid chamber 109 and the second fluid chamber 110 changes, the diaphragm assembly 370 can automatically adjust the fluid control valve 260 to return the differential pressure to its previous value. Advantageously, the positioner 102 shown in FIG. 3 can substantially reduce the cost and complexity of the actuator system by removing electronics required in the positioner 102 shown in FIG. 2. It should be understood however, that the diaphragm assembly 370 may be combined with the positioner 102 shown in FIG. 2 including the electronic controlling system.

The above described invention provides a positioner 102 for an actuator 101 that can control the position of the actuator 101 based on a differential pressure. Utilizing the differential pressure allows for a faster and more efficient response time than realized in prior art positioners that control an actuator based on a position sensor. The prior art positioners also provide fluid to the actuator based on a measured flow rate rather than basing the fluid on a differential pressure. By basing the fluid provided to the actuator 101 on a differential pressure, the present invention can realize much higher flow rates without sacrificing actuator stability.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other fluid operated actuators, and not just to the embodiments described above and shown in the accompanying figures. Accordingly, the scope of the invention should be determined from the following claims.

I claim:

1. A positioner (102) for controlling a fluid operated actuator (101) including a first fluid chamber (109) and a second fluid chamber (110), the positioner (102) comprising:
    a first fluid conduit (105) coupled to the first fluid chamber (109);
    a second fluid conduit (106) coupled to the second fluid chamber (110);
    a fluid control valve in communication with the first fluid conduit and second fluid conduit, wherein the fluid control valve is configured to control the fluid operated actuator;
    a differential pressure control loop comprising a differential pressure controller (240) in communication with a differential pressure sensor and the fluid control valve, adapted to control a fluid supply to the first and second fluid conduits (105, 106) based on a differential pressure between the first and second fluid chamber (109, 110), wherein if the difference between a desired differential pressure and the differential pressure between the first and second fluid chamber measured by the differential pressure sensor exceeds a first threshold value, the differential pressure controller is configured to signal the fluid control valve to change positions by adjusting the differential pressure between the first and second fluid chambers;
    a position controller in communication with a position sensor and the differential pressure controller, wherein the position sensor is coupled to the fluid operated actuator;
    an outer control loop comprising the position sensor, the position controller, the fluid control valve, the fluid operated actuator, and the differential pressure controller, wherein the position controller is configured to send a signal indicating the desired differential pressure to the differential pressure controller if a measured position of the fluid operated actuator is different from a desired actuator position by more than a second threshold value; and wherein the second threshold value of the outer control loop is greater than the first threshold value of the differential pressure control loop such that the differential pressure control loop comprises a primary control loop.

2. The positioner (102) of claim 1, wherein the fluid control valve (260) comprises:
- a fluid inlet (326) coupled to a pressurized fluid source;
- a first fluid outlet (365) coupled to the first fluid conduit (105); and
- a second fluid outlet (366) coupled to the second fluid conduit (106).

3. A method for controlling a fluid operated actuator including a first fluid chamber and a second fluid chamber, comprising the steps of:

generating a desired differential pressure between the first and second fluid chambers;

providing a differential pressure control loop comprising a differential pressure controller in communication with a differential pressure sensor and a fluid control valve;

measuring a measured differential pressure between the first and second fluid chambers;

adjusting the differential pressure between the first and second fluid chambers with the differential pressure controller to control a position of the fluid operated actuator if the difference between the desired differential pressure and the measured differential pressure exceeds a first threshold value;

providing an outer control loop comprising a position sensor, a position controller, the fluid control valve, the fluid operated actuator, and the differential pressure controller;

measuring a position of the actuator with the position sensor;

adjusting the differential pressure between the first and second fluid chambers with the differential pressure controller to control a position of the fluid operated actuator if the measured position of the fluid operated actuator is different from a desired actuator position by more than a second threshold value;

wherein the second threshold value of the outer control loop is greater than the first threshold value of the differential pressure control loop such that the differential pressure control loop comprises a primary control loop.

\* \* \* \* \*